United States Patent
Manepalli et al.

(10) Patent No.: US 10,815,824 B2
(45) Date of Patent: Oct. 27, 2020

(54) METHOD AND SYSTEM FOR ROTOR OVERSPEED PROTECTION

(71) Applicant: General Electric Company, Schenectady, NY (US)

(72) Inventors: Sanjeev Sai Kumar Manepalli, Karnataka (IN); Monty Lee Shelton, Loveland, OH (US); Ganesh Seshadri, Karnataka (IN); Mahendran Manoharan, Karnataka (IN)

(73) Assignee: General Electric, Schenectady, NY (US)

( * ) Notice: Subject to any disclaimer, the term of this patent is extended or adjusted under 35 U.S.C. 154(b) by 504 days.

(21) Appl. No.: 15/478,321

(22) Filed: Apr. 4, 2017

(65) Prior Publication Data

US 2018/0283203 A1 Oct. 4, 2018

(51) Int. Cl.
| | |
|---|---|
| *F01D 21/02* | (2006.01) |
| *F01D 21/04* | (2006.01) |
| *F01D 25/24* | (2006.01) |
| *F01D 5/02* | (2006.01) |
| *F01D 5/12* | (2006.01) |
| *F01D 9/04* | (2006.01) |

(52) U.S. Cl.
CPC ............ *F01D 21/02* (2013.01); *F01D 5/02* (2013.01); *F01D 5/12* (2013.01); *F01D 9/042* (2013.01); *F01D 21/045* (2013.01); *F01D 25/24* (2013.01); *F01D 25/246* (2013.01); *F05D 2220/323* (2013.01); *F05D 2260/311* (2013.01); *Y02T 50/671* (2013.01); *Y02T 50/673* (2013.01)

(58) Field of Classification Search
CPC ...... F01D 21/045; F01D 25/24; F01D 25/246; F05D 2220/323; F05D 2260/311
USPC ........................................................... 415/9
See application file for complete search history.

(56) References Cited

U.S. PATENT DOCUMENTS

| | | | | |
|---|---|---|---|---|
| 2,966,332 A | * | 12/1960 | Gardner | ............... F01D 21/006 415/9 |
| 4,498,291 A | * | 2/1985 | Jeffery | ................ F01D 21/045 415/9 |
| 4,503,667 A | | 3/1985 | Roberts | |
| 4,505,104 A | | 3/1985 | Simmons | |
| 5,145,316 A | * | 9/1992 | Birch | ..................... F01D 5/225 415/173.1 |
| 5,853,286 A | | 12/1998 | Bussonnet et al. | |
| 6,009,701 A | | 1/2000 | Freeman et al. | |

(Continued)

*Primary Examiner* — John M Zaleskas
(74) *Attorney, Agent, or Firm* — General Electric; Pamela Kachur (57) ABSTRACT

A gas turbine engine, system, and method of severing at least one blade of a row of blades spaced about a rotor during an over speed condition are provided. The gas turbine engine includes a shaft rotatable about an axis of the shaft, a rotor coupled to the shaft and having a radially outer surface, and one or more rows of blades spaced axially along the outer portion. Each row of blades includes a plurality of blades spaced circumferentially around the radially outer surface. A gas turbine engine casing at least partially surrounds the one or more rows of blades. One or more rows of stationary vanes are spaced axially along the casing. Each row of stationary vanes includes a plurality of stationary vanes extending radially between the shaft and the gas turbine engine casing. The stationary vanes are coupled to the gas turbine engine casing using a fuse element.

23 Claims, 7 Drawing Sheets

(56) References Cited

U.S. PATENT DOCUMENTS

| | | | | |
|---|---|---|---|---|
| 6,073,439 | A * | 6/2000 | Beaven | F01D 21/045 415/9 |
| 6,079,200 | A * | 6/2000 | Tubbs | F01D 21/045 415/9 |
| 6,109,022 | A * | 8/2000 | Allen | F01D 5/025 60/223 |
| 6,240,719 | B1 | 6/2001 | Vondrell et al. | |
| 6,402,469 | B1 | 6/2002 | Kastl et al. | |
| 7,686,571 | B1 * | 3/2010 | Matheny | F01D 9/041 415/200 |
| 8,061,969 | B2 | 11/2011 | Durocher et al. | |
| 8,621,871 | B2 | 1/2014 | McCune et al. | |
| 8,833,721 | B2 | 9/2014 | Sadil et al. | |
| 2004/0184912 | A1 * | 9/2004 | Crozet | F01D 11/24 415/191 |
| 2004/0240985 | A1 * | 12/2004 | Stephenson | F01D 21/045 415/9 |
| 2006/0087396 | A1 * | 4/2006 | Bouchy | F01D 21/045 337/14 |
| 2009/0126336 | A1 * | 5/2009 | Bart | F01D 21/006 60/39.091 |
| 2009/0169375 | A1 * | 7/2009 | Cortequisse | F01D 5/141 415/208.1 |
| 2010/0061844 | A1 * | 3/2010 | Hudson | F01D 9/042 415/189 |
| 2010/0135770 | A1 * | 6/2010 | Durocher | F01D 9/065 415/69 |
| 2011/0229314 | A1 * | 9/2011 | Dakowski | F01D 9/042 415/191 |
| 2015/0016985 | A1 | 1/2015 | Mahle et al. | |
| 2015/0354381 | A1 * | 12/2015 | Congratel | F01D 9/041 415/209.4 |
| 2017/0292403 | A1 * | 10/2017 | Schlemmer | F01D 9/041 |

* cited by examiner

METHOD AND SYSTEM FOR ROTOR OVERSPEED PROTECTION

BACKGROUND

The field of the disclosure relates generally to gas turbine engines and, more particularly, to rotor over speed protection.

Gas turbine engines include a rotor assembly which is rotatable relative to stationary engine structures. The engine may include a plurality of stages. Each stage includes a rotor blade assembly including a plurality of circumferentially spaced airfoils or blades, and a stationary vane assembly including a plurality of circumferentially spaced airfoils or vanes. Each rotor blade assembly is coupled to a rotor on a shaft which is configured to drive the gas turbine engine. Hot combustion gases interact with the blades to drive the rotor assembly. In some known rotor assemblies, disengagement of a portion of the rotor may result in an undesirable over speed condition. For example, disengagement of aft stages occurs when an aft rotor blade assembly stage separates from the rotor. The separated stage is still powered by the hot combustion gases, but the separated stage can no longer transfer that power to the shaft. The separated stage may rotate significantly faster than it rotates during normal operations because it is unloaded and still receiving power input from the combustion gases, causing the over speed condition.

BRIEF DESCRIPTION

In one aspect, a gas turbine engine includes a shaft rotatable about a longitudinal axis of the shaft, a rotor coupled to the shaft and having a radially outer surface, and one or more rows of blades spaced axially along the outer portion. Each of the one or more rows of blades includes a plurality of blades spaced circumferentially around the radially outer surface. The gas turbine engine also includes a gas turbine engine casing at least partially surrounding the one or more rows of blades, and one or more rows of stationary vanes spaced axially along the gas turbine engine casing. Each of the one or more rows of stationary vanes includes a plurality of stationary vanes extending radially between the shaft and the gas turbine engine casing. The stationary vanes are coupled to the gas turbine engine casing using a fuse element.

Optionally, the plurality of stationary vanes are spaced circumferentially about a radially inner surface of the gas turbine engine casing and the one or more rows of stationary vanes may be interdigitated axially with the one or more rows of blades. Also optionally, the gas turbine engine casing includes a railing extending circumferentially about a radially inner surface of the gas turbine engine casing, and an upstream end of a stationary vane of the plurality of stationary vanes includes a hook configured to engage the railing. At least one of the railing and the hook forms the fuse element. A pin element may extend through the railing and the hook, and the pin element also may form the fuse element.

Optionally, the gas turbine engine casing includes a railing extending circumferentially about a radially inner surface of the gas turbine engine casing, and at least some of the plurality of stationary vanes are ganged together in a vane sector assembly. An upstream end of the vane sector assembly includes a hook configured to engage the railing. At least one of the railing and the hook forms the fuse element. A pin element may extend through the railing and the hook, and the pin element also may form the fuse element.

The gas turbine engine casing may include an upstream extending lip extending circumferentially about a radially inner surface of the gas turbine engine casing, and a downstream end of a stationary vane of the plurality of stationary vanes may include a ledge configured to engage the lip. At least one of the lip and the ledge may form the fuse element. Optionally, the pin element extends through the lip and the ledge, and the pin element also may form the fuse element.

The gas turbine engine casing may include an upstream extending lip extending circumferentially about a radially inner surface of the gas turbine engine casing, and at least some of the plurality of stationary vanes may be ganged together in a vane sector assembly. A downstream end of the vane sector assembly may include a ledge configured to engage the lip, and at least one of the ledge, the lip, and a pin element extending through the ledge and the lip form the fuse element. A pin element may extend through the lip and the ledge, and the pin element also may form the fuse element.

Optionally, one or more rows of stationary vanes may be spaced uniformly axially along the gas turbine engine casing.

In another aspect, a method of severing at least one blade of a row of blades spaced circumferentially about a rotor of a turbine during an over speed condition of the rotor is provided. The method includes driving the rotor with engine combustion gases after a separation of the rotor from a shaft of the turbine, and translating the rotor axially along the shaft using an axial force of the rotor. The method also includes engaging the at least one blade of the row of blades with at least one stationary vane of a plurality of stationary vanes, and severing at least a portion of the at least one blade of the row of blades from the rotor using the at least one stationary vane of the plurality of stationary vanes.

The method optionally includes severing at least the portion of the at least one blade of the row of blades from the rotor using at least one of a root, a shank, an airfoil, a tip, and a shroud of the at least one stationary vane of the plurality of stationary vanes. The method may also include the step of imparting sufficient force on a fuse element to cause the fuse element to part, which may include tilting the at least one stationary vane of the plurality of stationary vanes into a rotational path of the at least one blade of the row of blades. Optionally, the method includes fracturing the at least one blade of the row of blades into a plurality of pieces of blade debris. Optionally, the rotor may include a plurality of rows of blades spaced axially along the shaft of the turbine, and the method may also include the step of directing the blade debris into a downstream row of blades of the plurality of rows of blades, such that the blade debris causes fracturing of at least some of the blades of the downstream row of blades of the plurality of rows of blades.

In yet another aspect, a hanger system includes one or more rows of airfoils spaced axially along a machine casing. Each of the one or more rows of airfoils includes a plurality of airfoils extending from the machine casing. At least one of the airfoils in a row being coupled to the machine casing by a hangar that includes a fuse element. Optionally, the machine casing includes a railing extending about a surface of the machine casing. A first end of an airfoil of the plurality of airfoils includes a hook configured to engage the railing. At least one of the railing and the hook includes the fuse element. The hanger system may further include a pin element extending through the railing and the hook wherein the pin element includes the fuse element.

Also optionally, the machine casing includes a lip extending about the surface of the machine casing, and wherein a second end of the airfoil of the plurality of airfoils includes a ledge configured to engage the lip. At least one of the lip and the ledge includes the fuse element. The hanger system may further include a pin element extending through the lip and the ledge wherein the pin element includes the fuse element.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to mitigating damage in a rotor overspeed event in industrial and commercial applications.

Embodiments of a system for mitigating damage resulting from an overspeed condition of a portion of a machine are described herein. In some embodiments, the machine is a rotatable machine that has a rotatable portion, such as, but not limited to a rotor configured to rotate about a longitudinal axis or axis of rotation. The machine may include rotatable machines, such as, but not limited to gas turbine engines, compressors, motors, steam turbines, wind turbines, water turbines, and the like. The embodiments include a clashing mechanism that uses a momentum or torque of the overspeeding machine to cause a controlled mitigating event that eventually stops the overspeed. The clashing mechanism facilitates inhibiting energy sources from supplying the rotor, and converts the energy to another form that facilitates stopping the overspeed. Additionally or alternatively, the clashing mechanism can damage the ability of rotor to generate work. More specifically, even if only a portion of the blades are lost or damaged, the rotor will become less efficient in generating work. The reduction of work extraction from the energy source reduces the acceleration of the rotor. The embodiments described herein reduce the terminal speeds reached by a rotor during an over speed condition. Reduced terminal speeds result in an ability to design lighter-weight rotors.

For example, mid-shaft events in turbofan engines result in loss of load on the low pressure turbine, causing the turbine to accelerate. In some embodiments, the rotating blades of the turbine are clashed with stationary vanes, causing damage to the blades. The loss of blades results in a loss of extraction of work from the hot gases of combustion, resulting in limiting the over speed of the turbine. The clash may be caused by an axial force acting on the rotor, resulting in the rotor translating aftward into the stationary nozzle vanes. The clashing of the turbine rotor with the stationary vanes results in higher axial loads on the stationary vanes, as compared to normal operating loads. As described herein, a mechanical fuse element is positioned in the stationary vane, such that the stationary vane liberates during the overspeed condition due to an excessive axial and/or circumferential load. The liberated stationary vane will move aft due the force exerted by the hot combustion gases and/or by the clashing force. The liberated stationary vane will then move into a plane of rotor rotation and cause additional obstruction to the rotor. The obstruction to the rotor blades in the path of rotation accelerates the damage of blades and results in a quick loss of the ability of the turbine to extract work, thereby limiting the excessive rotor speeds in the turbine. Such a clashing mechanism can result in lighter turbine rotor designs, as the over speed resulting from the event will be limited.

During a low pressure turbine clash event, as described above, an axial force acting on the rotor will move the rotor aftward to clash against the stationary vane casing assembly. The axial rotor-to-stationary-vane gaps at different stages of the rotor are different, which causes the rotor to clash against the stationary vanes in the stage having the smallest axial gap, resulting in the stationary vanes of that stage taking the entire axial load of the rotor. This axial load imparted to the stationary vanes (typically loading at the inner diameter of the stationary vanes due to a minimum clearance adjacent to angel wings of the blades) is reacted by a bending moment hinging on the casing assembly. When such axial load is applied, embodiments of the present disclosure permit at least a portion of the stationary vane support to decouple, detaching the stationary vane(s) from the casing assembly. The detached stationary vane is liberated in the hot gas flow path, and the fluid force from the combustion gases and/or the force imparted due to clashing cause the stationary vane to move aftward and to come into a path of rotation of rotor blades of downstream stages. Impacting the downstream rotor blades causes significant damage to the rotor blades. This means of rotor blade destruction is relatively fast and facilitates slowing down the acceleration of the rotor, thereby reducing the terminal speed of the over speed condition. This liberation of stationary vanes into the hot gas flow path has demonstrated significant damage to the rotor blades during evaluation.

The technical advantages of the described apparatus and method over the present state of the art include improved efficiency of the low pressure turbine due to elimination of banana vanes commonly used for over speed blade destruction, more efficient axial gaps between the rotor blades and stationary vanes in each stage, and an elimination of the need to compromise on other low pressure turbine axial clearances, which results in efficient secondary flow systems and mechanical designs. Elimination of the banana vanes also permits a reduction in engine weight due to an axial length reduction and a reduction in a weight of the rotor system, as the design may be limited to lower overspeed conditions.

In addition, using fuse elements in clashing components avoids a need to have a three dimensional (3-D) shape of the clashing vane. Known clashing vanes include a 3-D airfoil with forward sweep in the midspan region. With the fuse element clashing component technology described herein, the clashing vane need not be forward swept and can also be straight. Also, because the sweep is straight at the leading edge and trailing edge of the clashing vane, the axial gaps between the clashing vanes and the upstream/downstream blade rows are uniform, with less variation from hub to tip. Due to this, mixing losses in the upstream/downstream blade rows, and unsteady flow losses associated with the mixing losses, are reduced significantly. Further, with the removal of the banana-shaped clashing vanes, the non-uniformity in the total pressure profile downstream of the clashing vane is avoided, which is beneficial for the reduction in vorticity in the downstream blades and vanes.

The following description refers to the accompanying drawings, in which, in the absence of a contrary representation, the same numbers in different drawings represent similar elements.

Figure 1:
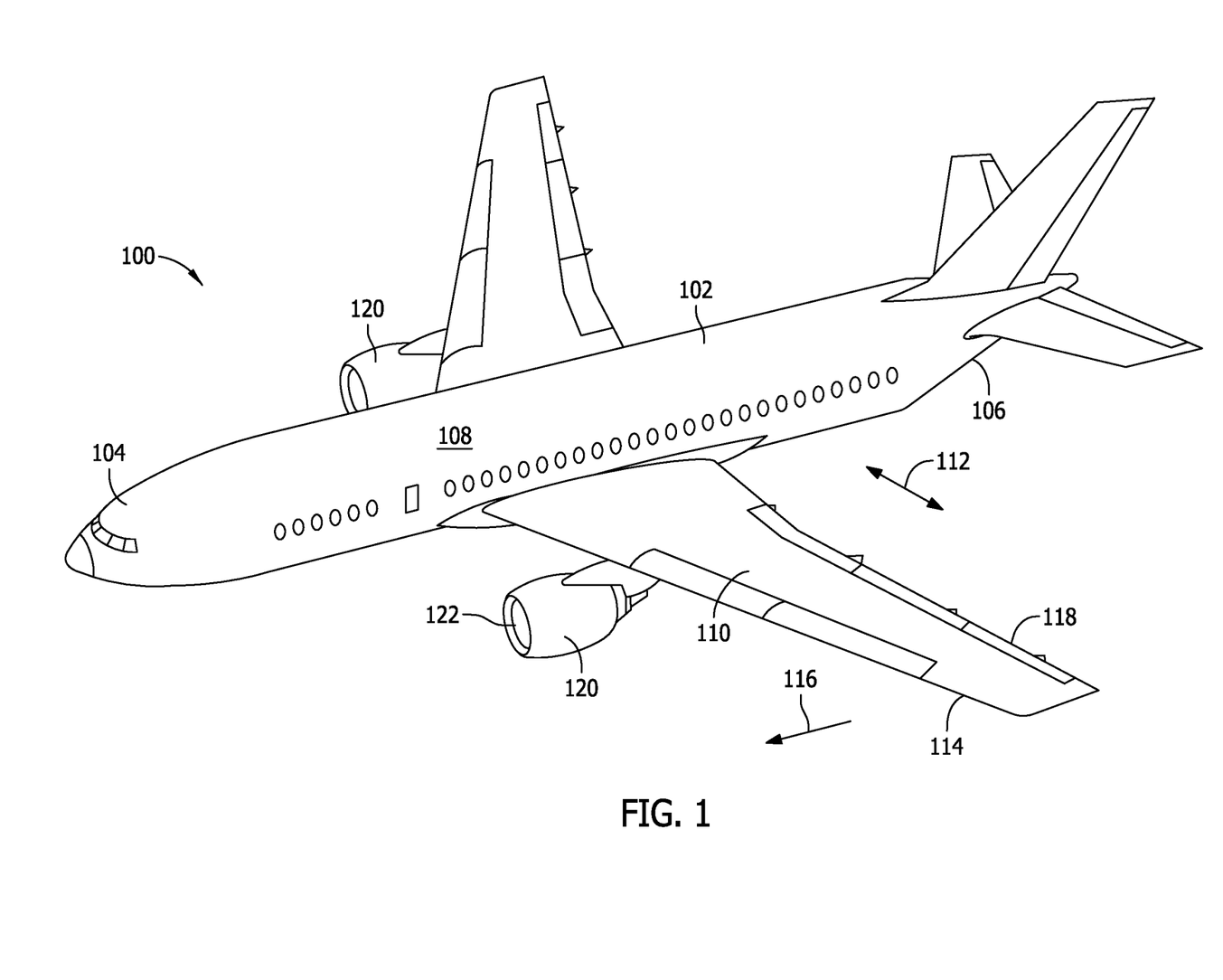
FIG. 1 is a perspective view of an aircraft.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one gas turbine engine 120 configured to drive a bladed rotatable member 122 or fan to generate thrust. An engine pylon 124, for example, may couple the at least one gas turbine engine 120 to at least one of wing 110 and fuselage 102, for example, in a pusher configuration proximate tail 106.

Figure 2:
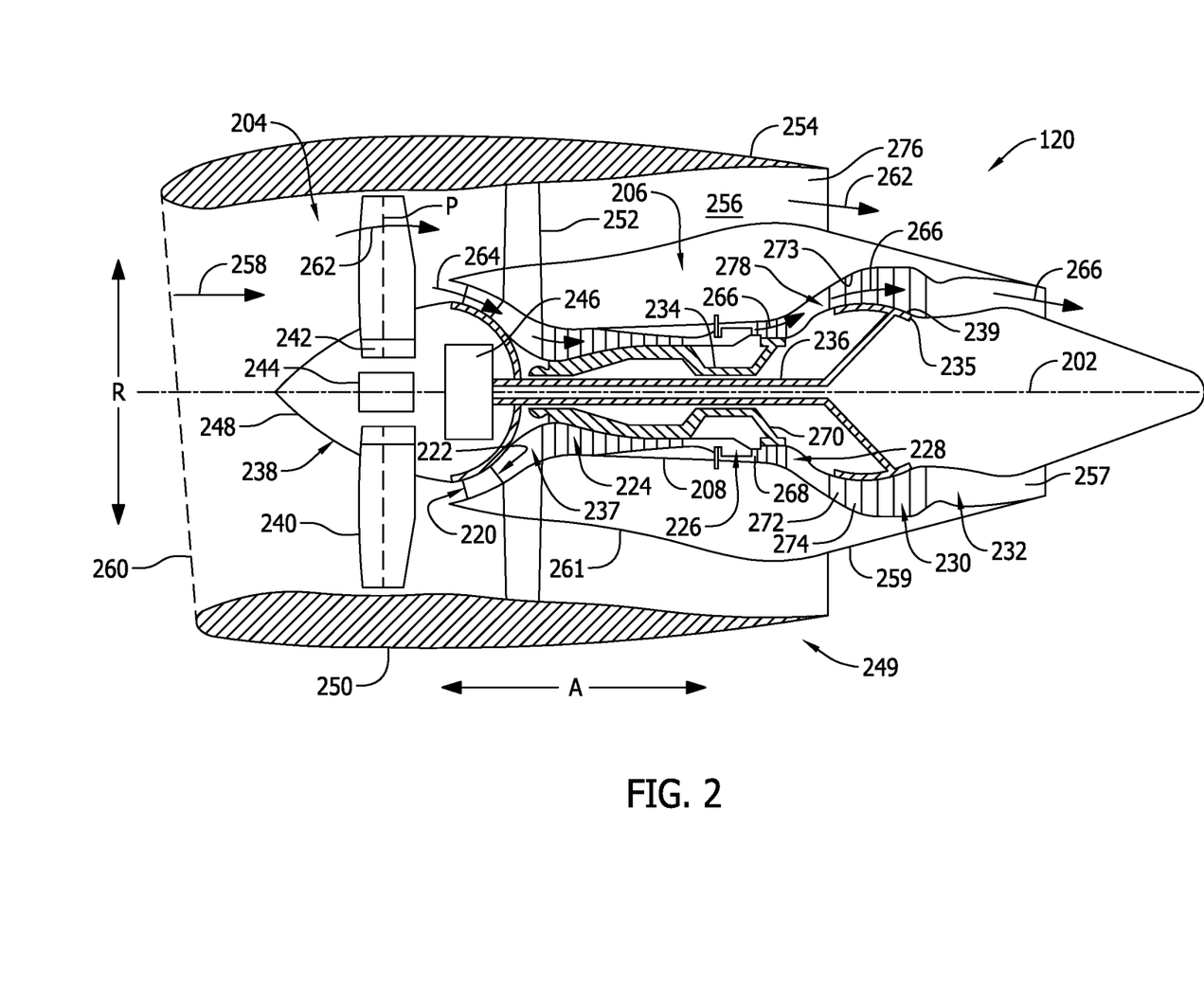
FIG. 2 is a schematic cross-sectional view of gas turbine engine in accordance with an exemplary embodiment of the present disclosure.

FIG. 2 is a schematic cross-sectional view of a rotatable machine, such as, gas turbine engine 120 in accordance with an exemplary embodiment of the present disclosure. In the example embodiment, gas turbine engine 120 is embodied in a high bypass turbofan jet engine. As shown in FIG. 2, gas turbine engine 120 defines an axial direction A (extending parallel to a longitudinal axis 202 provided for reference) and a radial direction R. In general, gas turbine engine 120 includes a fan assembly 204 and a core turbine engine 206 disposed downstream from fan assembly 204.

In the example embodiment, core turbine engine 206 includes an approximately tubular gas turbine engine casing 208 that defines an annular core engine inlet 220. Gas turbine engine casing 208 encases, in serial flow relationship, a compressor section including a booster or low pressure (LP) compressor 222 and a high pressure (HP) compressor 224; a combustor 226; a turbine section including a high pressure (HP) turbine 228 and a low pressure (LP) turbine 230; and a jet exhaust nozzle 232. A high pressure (HP) spool or shaft 234 drivingly connects HP turbine 228 to HP compressor 224. A low pressure (LP) spool or shaft 236 drivingly connects LP turbine 230 to LP compressor 222. The compressor section, combustor 226, turbine section, and jet exhaust nozzle 232 together define a core air flowpath 237.

In the example embodiment, fan assembly 204 includes a variable pitch fan 238 having a plurality of fan blades 240 coupled to a fan disk 242 in a spaced apart relationship. Fan blades 240 extend radially outwardly from fan disk 242. Each fan blade 240 is rotatable relative to fan disk 242 about a pitch axis P by virtue of fan blades 240 being operatively coupled to a suitable pitch change mechanism (PCM) 244 configured to vary the pitch of fan blades 240. In other embodiments, pitch change mechanism 244 is configured to collectively vary the pitch of fan blades 240 in unison. Fan blades 240, fan disk 242, and pitch change mechanism 244 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Fan disk 242 is covered by rotatable front hub 248 aerodynamically contoured to promote an airflow through the plurality of fan blades 240. Additionally, fan assembly 204 and at least a portion of core turbine engine 206 are surrounded by a nacelle assembly 249, which may include an annular fan casing or outer nacelle 250 that circumferentially surrounds fan 238 and/or at least a portion of core turbine engine 206. In the example embodiment, outer nacelle 250 is configured to be supported relative to core turbine engine 206 by a plurality of circumferentially-spaced outlet guide vanes 252. Moreover, a downstream section 254 of outer nacelle 250 may extend over an outer portion of core turbine engine 206 so as to define a bypass duct 256 therebetween.

Nacelle assembly 249 is a system of components or structures attached to gas turbine engine 120 and/or engine pylon 124, which provides aerodynamic surfaces around gas turbine engine 120, defines a portion of bypass duct 256, defines core engine inlet 220 and bypass duct 256, defines appropriate nozzles for the exhaust of bypass duct 256 and a core exhaust 257, and houses or contains auxiliary devices for the engine and other components for the aircraft including various ducts, lines, pipes and wires.

Nacelle assembly 249 may be subdivided into outer nacelle 250 and a core engine cowl or inner nacelle 259 generally separated by bypass duct 256. Outer nacelle 250 may include an inlet opening 260. Outer nacelle 250 may also partially overlap a forward portion 261 of inner nacelle 259, with outer nacelle 250 providing a radially outer wall for bypass duct 256 and inner nacelle 259 providing a radially inner wall.

Inner nacelle 259 forms at least a part a generally cylindrical or barrel-shaped cowl formed around the gas turbine engine casing 208. Inner nacelle 259 houses and is configured to provide an aerodynamic cover for gas turbine engine casing 208.

During operation of gas turbine engine 120, a volume of air 258 enters gas turbine engine 120 through associated inlet opening 260 of outer nacelle 250 and/or fan assembly 204. As volume of air 258 passes across fan blades 240, a bypass portion 262 of volume of air 258 is directed or routed into bypass duct 256 and a core engine portion 264 of volume of air 258 is directed or routed into core air flowpath 237, or more specifically into LP compressor 222. A ratio between bypass portion 262 and core engine portion 264 is commonly referred to as a bypass ratio. The pressure of core engine portion 264 is then increased as it is routed through high pressure (HP) compressor 224 and into combustor 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stationary airfoils or vanes 268 that are coupled to gas turbine engine casing 208 and HP turbine rotor blades 270 that are coupled to HP spool or shaft 234, thus causing HP spool or shaft 234 to rotate, which then drives a rotation of HP compressor 224. Combustion gases 266 are then routed through LP turbine 230 where a second portion of thermal and kinetic energy is extracted from combustion gases 266 via sequential stages of stationary airfoils or vanes 272 that are coupled to a radially inner surface 273 of gas turbine engine casing 208 and LP turbine rotor blades 274 that are coupled to LP spool or shaft 236 through a rotor 235 of LP turbine 230 having a radially outer surface 239. LP spool or shaft 236 drives a rotation of LP compressor 222 and/or rotation of fan 238. In various embodiments, sequential stages of stationary vanes 272 include a plurality of circumferentially spaced individual vanes, each attached separately through a hangar system 306 (shown in FIG. 3). In other embodiments, sequential stages of stationary vanes 272 are attached to gas turbine engine casing 208 in a gang with others of the plurality of circumferentially spaced vanes, which form a vane sector 400 (shown in FIG. 4), sometimes referred to as a doublet if two vanes are ganged together, a triplet if three vanes are ganged together, and so on.

Combustion gases 266 are subsequently routed through jet exhaust nozzle 232 of core turbine engine 206 to provide propulsive thrust. Simultaneously, the pressure of bypass portion 262 is substantially increased as bypass portion 262 is routed through bypass duct 256 before it is exhausted from a fan exhaust nozzle 276 of gas turbine engine 120, also providing propulsive thrust. HP turbine 228, LP turbine 230, and jet exhaust nozzle 232 at least partially define a hot gas path 278 for routing combustion gases 266 through core turbine engine 206.

Gas turbine engine 120 is depicted in the figures by way of example only. In other exemplary embodiments, gas turbine engine 120 may have any other suitable configuration including for example, a turboprop engine, a turboshaft engine, a military purpose engine, and a marine or land-based aero-derivative engine.

Figure 3:
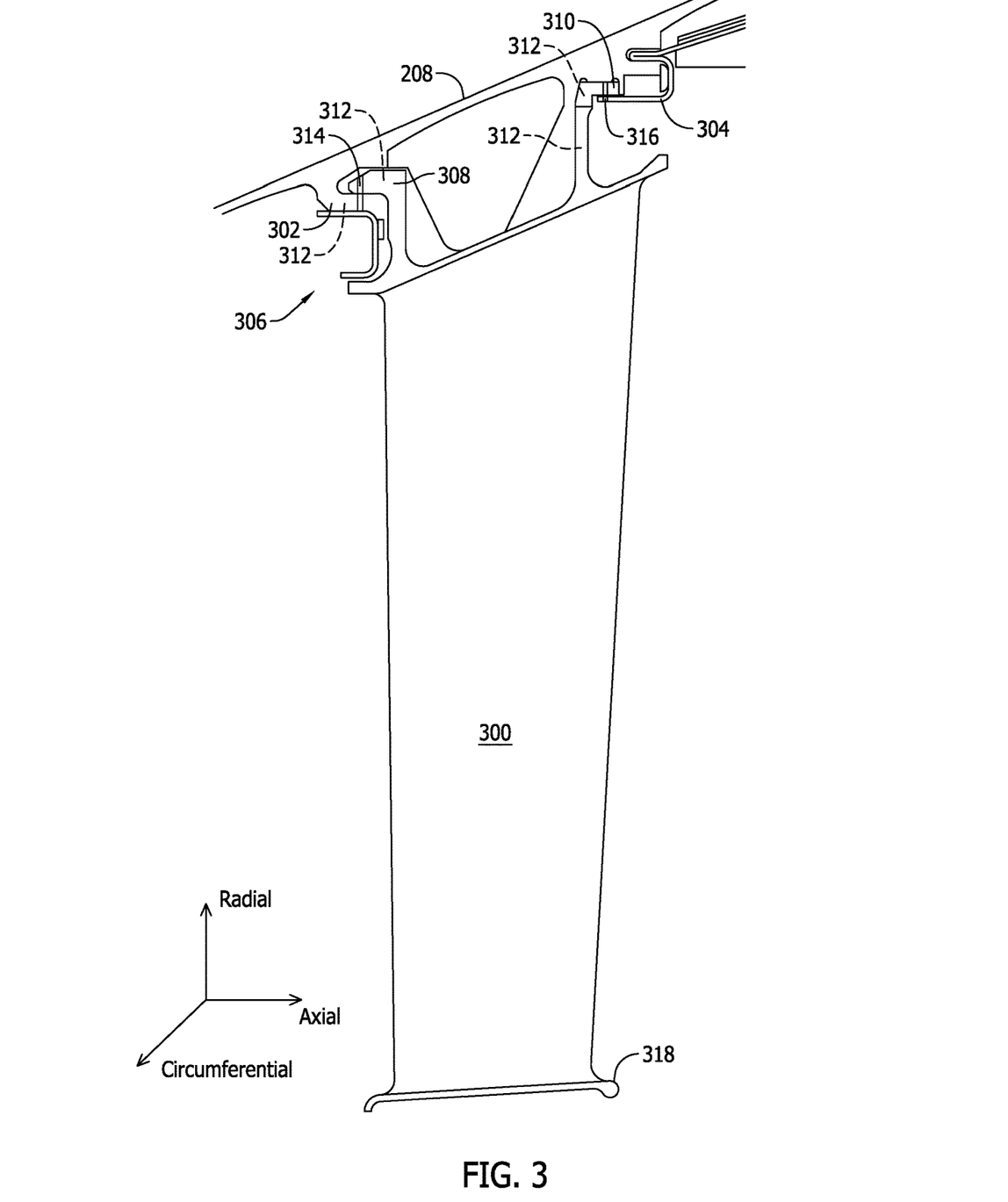
FIG. 3 is a side elevation view of a stationary vane including a hanger system in accordance with an example embodiment of the present disclosure.

FIG. 3 is a side elevation view of a stationary airfoil or vane 300 in accordance with an example embodiment of the present disclosure. In the example embodiment, stationary vane 300 is implemented as one of LP stationary vanes 272 of gas turbine engine 120 (shown in FIG. 2). More specifically, in the example embodiment, gas turbine engine casing 208 at least partially surrounds LP turbine 230 (shown in FIG. 2). Gas turbine engine casing 208 includes a circumferentially extending railing 302 and a circumferentially extending ledge 304 axially spaced from railing 302. Stationary vane 300 includes a hanger system 306 coupled to casing 208. More specifically, hanger system 306 includes a first hanger or hook 308 configured to engage railing 302, and a second hanger or lip 310 configured to engage ledge 304. In various embodiments, the engagement of lip 310 and ledge 304 may hold lip 310 and ledge 304 fixed in one axial position, while the engagement of hook 308 and railing 302 may permit sliding axial movement of hook 308 with respect to railing 302 to accommodate expansion and contraction during heating and cooling of LP turbine 230. Hanger system 306 further includes a fuse element 312 formed in at least one of railing 302, hook 308, lip 310, ledge 304, a pin 314 extending through hook 308 and railing 302, and a pin 316 extending through lip 310 and ledge 304.

With reference to FIGS. 2 and 3, gas turbine engine casing 208 includes one or more rows or stages of stationary vanes 272 of LP turbine 230 that are interdigitated with one or more rows or stages of LP turbine rotor blades 274. In various embodiments, at least one stationary vane 300 of one or more rows or stages of stationary vanes 272 are coupled to gas turbine engine casing 208 via hanger system 306. Fuse element 312 is configured to decouple when a blade of the one or more rows of blades 274 clashes with the one or more rows of vanes 272. Fuse element 312 may be formed of a reduced or "necked-down" dimensional feature to provide a controlled decoupling location. For example, pins 314 and 316 may include an area of reduced diameter along a length of the pin. Preferably, the area of reduced diameter of pin 314 is positioned where railing 302 and hook 308 engage, and the area of reduced diameter of pin 316 is positioned where lip 310 and ledge 304 engage. Additionally or alternatively, fuse element 312 may include a treated portion such that the treated portion is weakened, relative to other portions of fuse element 312, by the treatment. A laser, chemical, heat, mechanical, or other treatment may be used to weaken the treated portion of fuse element 312 without affecting its physical dimensions. Fuse element 312 may also be formed of a material than is different from a material of the components which fuse element 312 is in contact with. If fuse element 312 is formed in an additive manufacturing process, fuse element 312 may be built up of a different material than the surrounding material. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, freeform fabrication, and the like. One exemplary type of additive manufacturing process uses a laser beam to sinter or melt a powder material. Additive manufacturing processes can employ powder materials or wire as a raw material. Moreover, additive manufacturing processes can generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer.

A radially inner end 318 of stationary vane 300 may be independent of the radially inner ends of adjacent vanes or may be shrouded or ganged with radially inner ends 318 of adjacent vanes, such as with the radially inner ends of doublet or triplet vanes.

Figure 4:
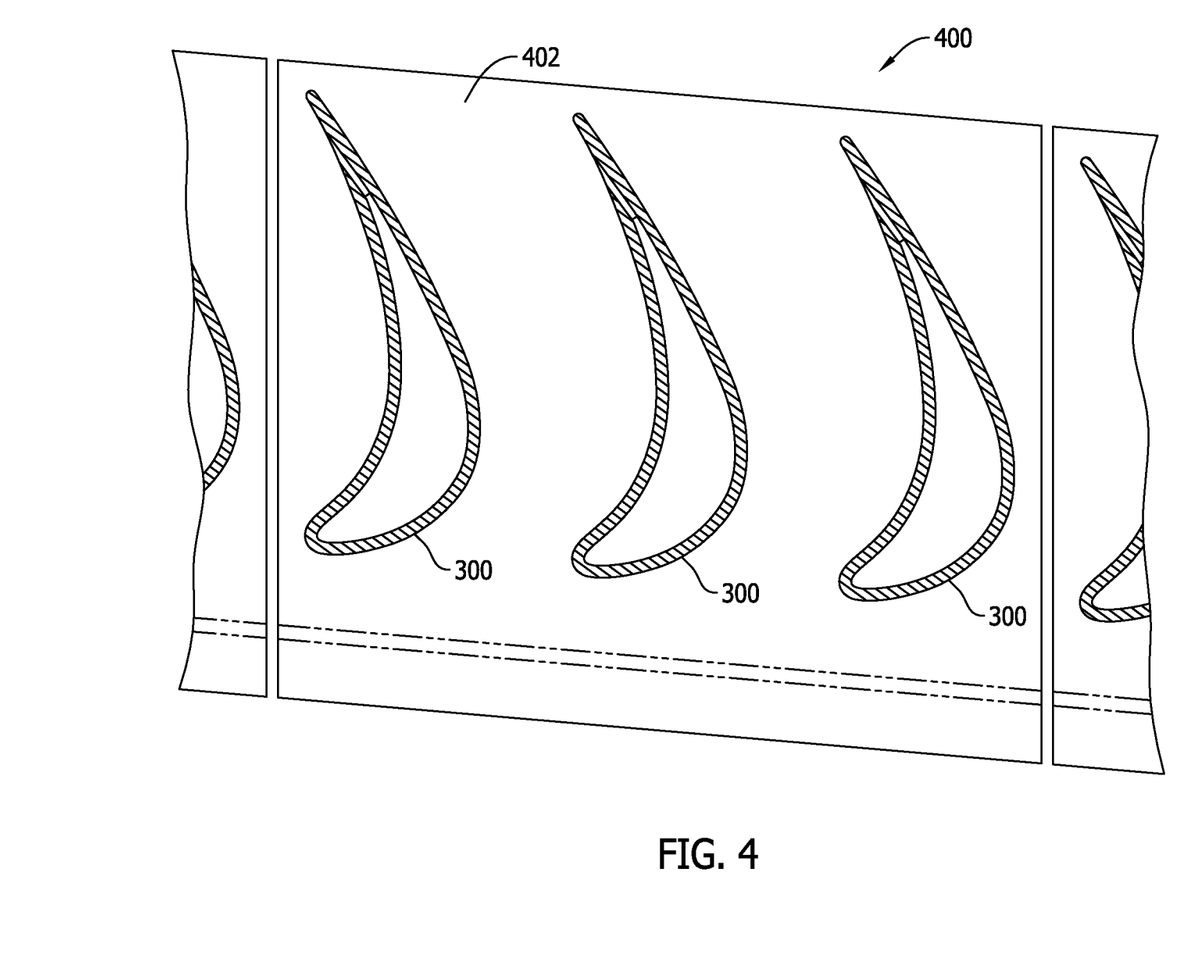
FIG. 4 is a planform section view of a vane sector in accordance with an example embodiment of the present disclosure.

FIG. 4 is a planform section view of a vane sector 400 in accordance with an example embodiment of the present disclosure. In the view of FIG. 4, hanger system 306 is omitted for clarity. Stationary vanes 300 are positioned side-by-side with their respective radially inner ends 318 (shown in FIG. 3) coupled to a radially inner shroud 402 to form vane sector 400. In the example embodiment, vane sector 400 is a triplet, that is, vane sector 400 includes three stationary vanes 300. Alternatively, vane sector 400 includes any suitable number of stationary vanes 300.

Figure 5:
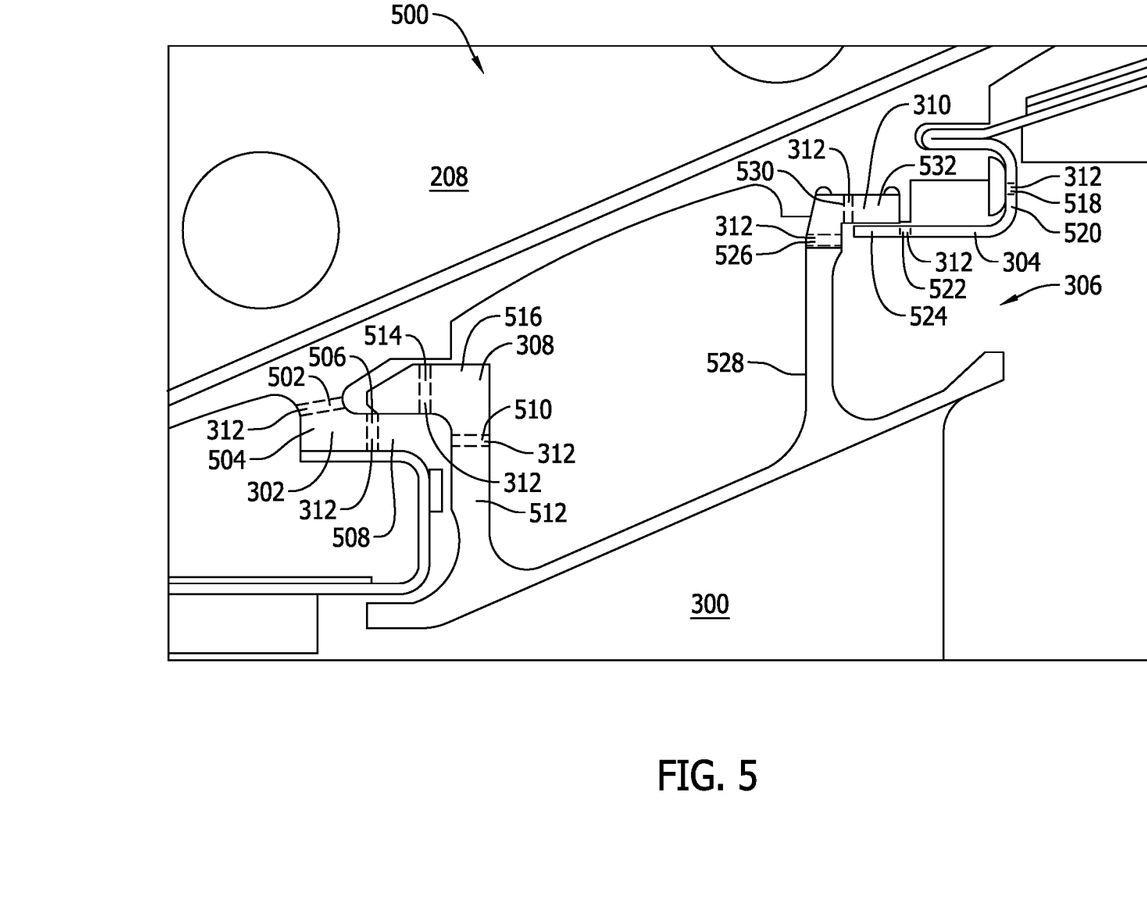
FIG. 5 is a side elevation view of another example embodiment of a hanger system for use with the stationary vane shown in FIG. 3.

FIG. 5 is a side elevation view of another example embodiment of hanger system 306. In the example embodiment, fuse element 312 may be formed at any of several locations on railing 302, hook 308, lip 310, and ledge 304. For example, fuse element 312 may include a first railing fuse element 502 formed axially across a radially inwardly extending portion 504 of railing 302. Similarly, fuse element 312 may include a second railing fuse element 506 formed radially across an axially extending portion 508 of railing 302.

Other embodiments of fuse element 312 may be formed on hook 308. For example, fuse element 312 may include a first hook fuse element 510 formed axially across a radially outwardly extending portion 512 of hook 308. Similarly, fuse element 312 may include a second hook fuse element 514 formed radially across an axially extending portion 516 of hook 308.

Additionally or alternatively, fuse element 312 may include a first ledge fuse element 518 formed axially across a radially inwardly extending portion 520 of ledge 304. Similarly, fuse element 312 may include a second ledge fuse element 522 formed radially across an axially extending portion 524 of ledge 304.

Still other embodiments of fuse element 312 may be formed on lip 310. For example, fuse element 312 may include a first lip fuse element 526 formed axially across a radially outwardly extending portion 528 of lip 310. Similarly, fuse element 312 may include a second lip fuse element 530 formed radially across an axially extending portion 532 of lip 310.

Figure 6:
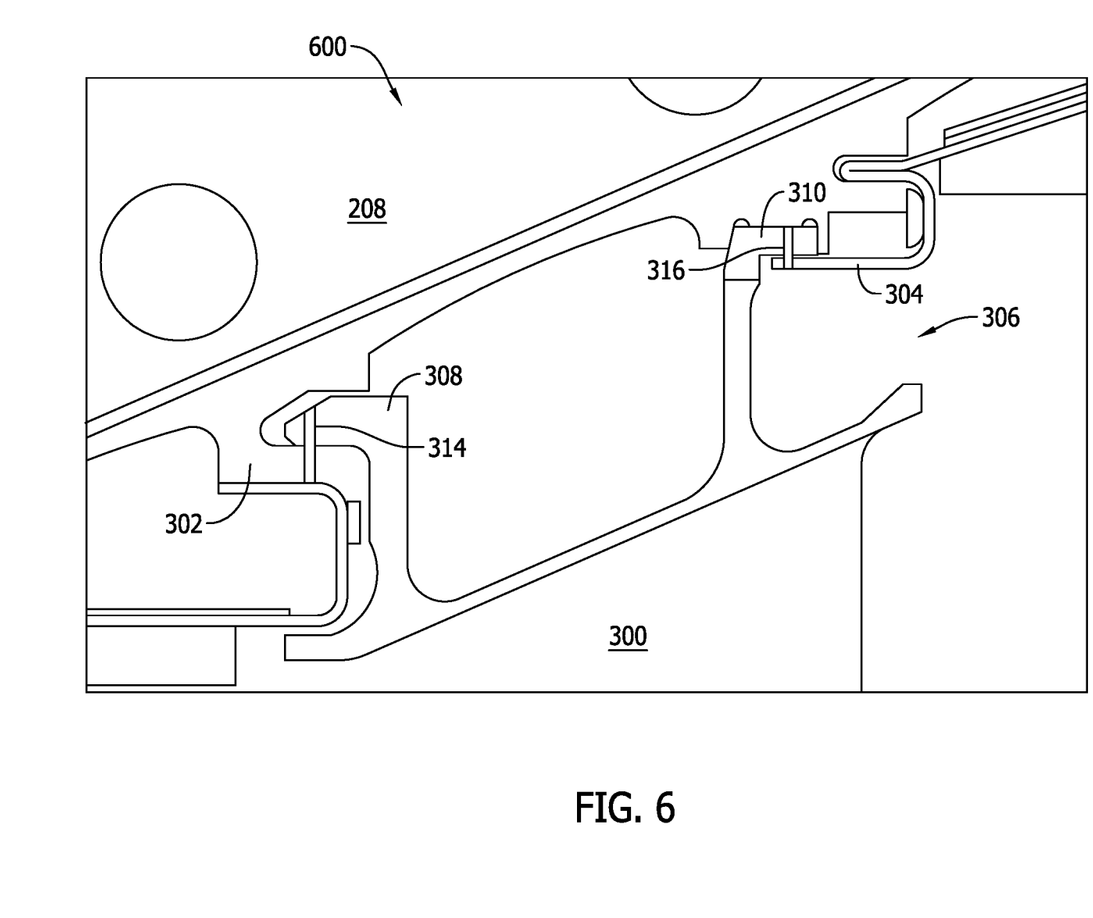
FIG. 6 is a side elevation view of yet another example embodiment of a hanger system for use with the stationary vane shown in FIG. 3.

FIG. 6 is a side elevation view of another example embodiment of hanger system 306. In the example embodiment, fuse element 312 may be formed from, for example, pin 314 extending through hook 308 and railing 302, and/or pin 316 extending through lip 310 and ledge 304. In each of pin 314 and pin 316, a respective weakened area 602 and weakened area 604 is formed by dimensional reduction or by chemical, mechanical, or other treatment, to alter the structure of weakened area 602 and/or weakened area 604.

Figure 7:
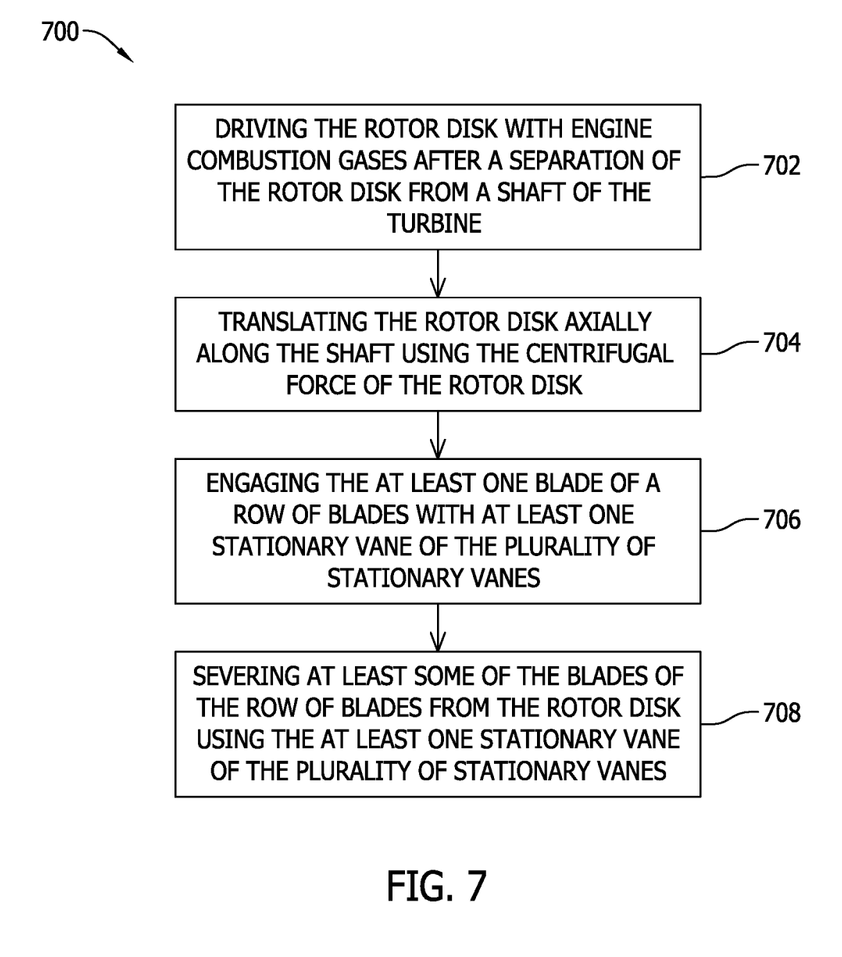
FIG. 7 is a flowchart of a method of severing at least one blade of a row of blades spaced circumferentially about a rotor of a turbine during an over speed condition of the rotor.

FIG. 7 is a flowchart of a method 700 of severing at least one blade of a row of blades spaced circumferentially about a rotor of a turbine, such as at least one of blades 274 of rotor 235 of gas turbine engine 120 (shown in FIG. 2), during an over speed condition of the rotor. With reference also to FIG. 2, in the example embodiment, method 700 includes driving 702 the rotor with engine combustion gases after a separation of the rotor from a shaft of the turbine, such as shaft 236. Method 700 also includes translating 704 the rotor axially along the shaft using an axial force of the rotor, and engaging 706 the at least one blade of the row of blades with at least one stationary vane of a plurality of stationary vanes, such as one of stationary vanes 272. Method 700 further includes severing 708 the at least one blade of the row of blades from the rotor using the at least one stationary vane of the plurality of stationary vanes.

The above described embodiments of a method and system of clashing rotor blades on an overspeeding rotor with stationary vanes coupled to a fixed casing provides a cost-effective and reliable means for reducing damage in an overspeed event More specifically, the methods and systems described herein facilitate providing an overspeed mitigation system without the use of a banana vane or a control mechanism to limit overspeed events such as, but not limited to a sensing system and fuel controls. Reducing the speed the overspeed can attain also permits reducing the design parameters to which the rotor assembly is formed, which in turn allows for additional weight reduction In addition, the above described methods and systems facilitate providing additional room in the flowpath of the machine due to the absence of the banana vane. As a result, the methods and systems described herein facilitate improving the efficiency and manufacturability of a machine in a cost-effective and reliable manner.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gas turbine engine comprising:
a shaft rotatable about a longitudinal axis;
a rotor coupled to the shaft and having a radially outer surface;
one or more rows of blades spaced axially along the radially outer surface, each of the one or more rows of blades comprising a plurality of blades spaced circumferentially around the radially outer surface;
a gas turbine engine casing at least partially surrounding the one or more rows of blades, the gas turbine engine casing including a railing extending circumferentially from a radially inner surface of the gas turbine engine casing;
one or more rows of stationary vanes spaced axially along the gas turbine engine casing, each of the one or more rows of stationary vanes comprising a plurality of stationary vanes extending radially between the shaft and the gas turbine engine casing, the stationary vanes coupled to the gas turbine engine casing using a hanger system, the hanger system including a hook positioned on an upstream portion of each of the stationary vanes and configured to engage the railing, the hook including at least one hook fuse element formed in and radially across an axially extending portion of the hook.

2. The gas turbine engine of claim 1, wherein the plurality of stationary vanes are spaced circumferentially about the radially inner surface of the gas turbine engine casing.

3. The gas turbine engine of claim 1, wherein the one or more rows of stationary vanes are interdigitated axially with the one or more rows of blades.

4. The gas turbine engine of claim 1, wherein the railing includes a railing fuse element formed in and axially across a radially inwardly extending portion of the railing.

5. The gas turbine engine of claim 1, wherein said gas turbine at least some of said plurality of stationary vanes are ganged together in a vane sector assembly.

6. The gas turbine engine of claim 1, wherein the gas turbine engine casing comprises a ledge extending circumferentially about the radially inner surface of the gas turbine engine casing, and wherein the hanger system includes a lip positioned on a downstream end of each stationary vane of the plurality of stationary vanes and configured to engage the ledge, the lip including at least one lip fuse element formed in and axially across a radially outwardly extending portion of the lip.

7. The gas turbine engine of claim 1, wherein at least some of the plurality of stationary vanes are ganged together in a vane sector assembly.

8. The gas turbine engine of claim 1, wherein the one or more rows of stationary vanes are spaced uniformly axially along the gas turbine engine casing.

9. A method of severing at least one blade of a row of blades spaced circumferentially about a rotor of a turbine during an over speed condition of the rotor, the method comprising:
providing a shaft rotatable about a longitudinal axis; the rotor coupled to the shaft and having a radially outer surface; one or more rows of blades spaced axially along said radially outer surface, each of the one or more rows of blades comprising a plurality of blades spaced circumferentially around the radially outer surface; a gas turbine engine casing at least partially surrounding the one or more rows of blades; and one or more rows of stationary vanes spaced axially along the gas turbine engine casing, each of the one or more rows of stationary vanes comprising a plurality of stationary vanes extending radially between the shaft and the gas turbine engine casing, the stationary vanes coupled to the gas turbine engine casing using a hanger system, the hanger system including a hook positioned on an upstream portion of each of the stationary vanes, the hook including at least one hook fuse element formed therein;
driving the rotor with engine combustion gases after a separation of the rotor from the shaft of the turbine;
translating the rotor axially along the shaft using an axial force of the rotor;
engaging the at least one blade of the row of blades with at least one stationary vane of the plurality of stationary vanes
severing at least a portion of the at least one blade of the row of blades from the rotor using the at least one stationary vane of the plurality of stationary vanes.

10. The method of claim 9, wherein severing at least the portion of the at least one blade of the row of blades from the rotor using the at least one stationary vane of the plurality of stationary vanes comprises severing at least some of the blades of the row of blades from the rotor using at least one of a root, a shank, an airfoil, a tip, and a shroud of the at least one stationary vane of the plurality of stationary vanes.

11. The method of claim 9, wherein engaging the at least one blade of the row of blades with the at least one stationary vane of the plurality of stationary vanes comprises imparting sufficient force on the hook fuse element to cause the hook fuse element to part.

12. The method of claim 11, wherein imparting sufficient force on the hook fuse element to cause the hook fuse element to part comprises tilting the at least one stationary vane of the plurality of stationary vanes into a rotational path of the at least one blade of the row of blades.

13. The method of claim 9, wherein severing at least the portion of the at least one blade of the row of blades from the rotor using the at least one stationary vane of the plurality of stationary vanes further comprises fracturing the at least one blade of the row of blades into a plurality of pieces of blade debris.

14. The method of claim 13, wherein the rotor includes a plurality of rows of blades spaced axially along the shaft of the turbine, the method further comprising directing the blade debris into a downstream row of blades of the plurality of rows of blades, the blade debris causing fracturing of at least some of the blades of the downstream row of blades of the plurality of rows of blades.

15. A hanger system comprising one or more rows of airfoils spaced axially along a machine casing, each of the one or more rows of airfoils comprising a plurality of airfoils extending from the machine casing, at least one of the airfoils in a row being coupled to the machine casing by a hanger configured to engage a railing extending circumferentially from a radially inner surface of the machine casing, the hanger including a hook being positioned on an upstream portion of the at least one airfoil, and wherein the hook includes at least one hook fuse element formed therein.

16. The hanger system of claim 15, further including a pin extending through the hanger and the railing, the pin including a pin fuse element.

17. The hanger system of claim 15, further comprising a lip and a ledge, the ledge extending circumferentially about the radially inner surface of the machine casing and the lip being positioned on a downstream end of the at least one airfoil and configured to engage the ledge, wherein the lip includes at least one lip fuse element formed therein and the ledge includes at least one ledge fuse element formed therein.

18. The hanger system of claim 17, wherein the railing includes at least one railing fuse element formed therein.

19. A gas turbine engine comprising:
a shaft rotatable about a longitudinal axis;
a rotor coupled to the shaft and having a radially outer surface;
one or more rows of blades spaced axially along the radially outer surface, each of the one or more rows of blades comprising a plurality of blades spaced circumferentially around the radially outer surface;
a gas turbine engine casing at least partially surrounding the one or more rows of blades;
one or more rows of stationary vanes spaced axially along the gas turbine engine casing, each of the one or more rows of stationary vanes comprising a plurality of stationary vanes extending radially between the shaft and the gas turbine engine casing, the stationary vanes coupled to the gas turbine engine casing using a hanger system, the hanger system including a hook positioned on an upstream portion of each of the stationary vanes, the hook including at least one hook fuse element formed therein that is configured to decouple when a blade of the one or more rows of blades clashes with a vane of the stationary vanes.

20. The gas turbine engine of claim 19, wherein the gas turbine engine casing comprising a railing extending circumferentially about the radially inner surface of the gas turbine engine casing, and wherein the hook is configured to engage the railing.

21. The gas turbine engine of claim 19, wherein the gas turbine engine casing comprising a railing extending circumferentially about the radially inner surface of the gas turbine engine casing, the hook being configured to engage the railing, and wherein a pin element extends through the railing and the hook, the pin element comprising a pin fuse element.

22. The gas turbine engine of claim 19, wherein the gas turbine engine casing comprising a railing extending circumferentially about the radially inner surface of the gas turbine engine casing, the hook being configured to engage the railing, the hanger system further including a lip and a ledge, the ledge extending circumferentially about the radially inner surface of the gas turbine engine casing and the lip being positioned on a downstream end of each of the stationary vanes and configured to engage the ledge, wherein the lip includes at least one lip fuse element formed therein and the ledge includes at least one ledge fuse element formed therein.

23. The gas turbine engine of claim 19, wherein the gas turbine engine casing comprising a railing extending circumferentially about the radially inner surface of the gas turbine engine casing, the hook being configured to engage the railing, and wherein the railing includes a railing fuse element formed therein.

* * * * *